G. HAZELMAN.
PLOW GUIDE WHEEL HOLDER.
APPLICATION FILED OCT. 31, 1919.
1,351,382.
Patented Aug. 31, 1920.
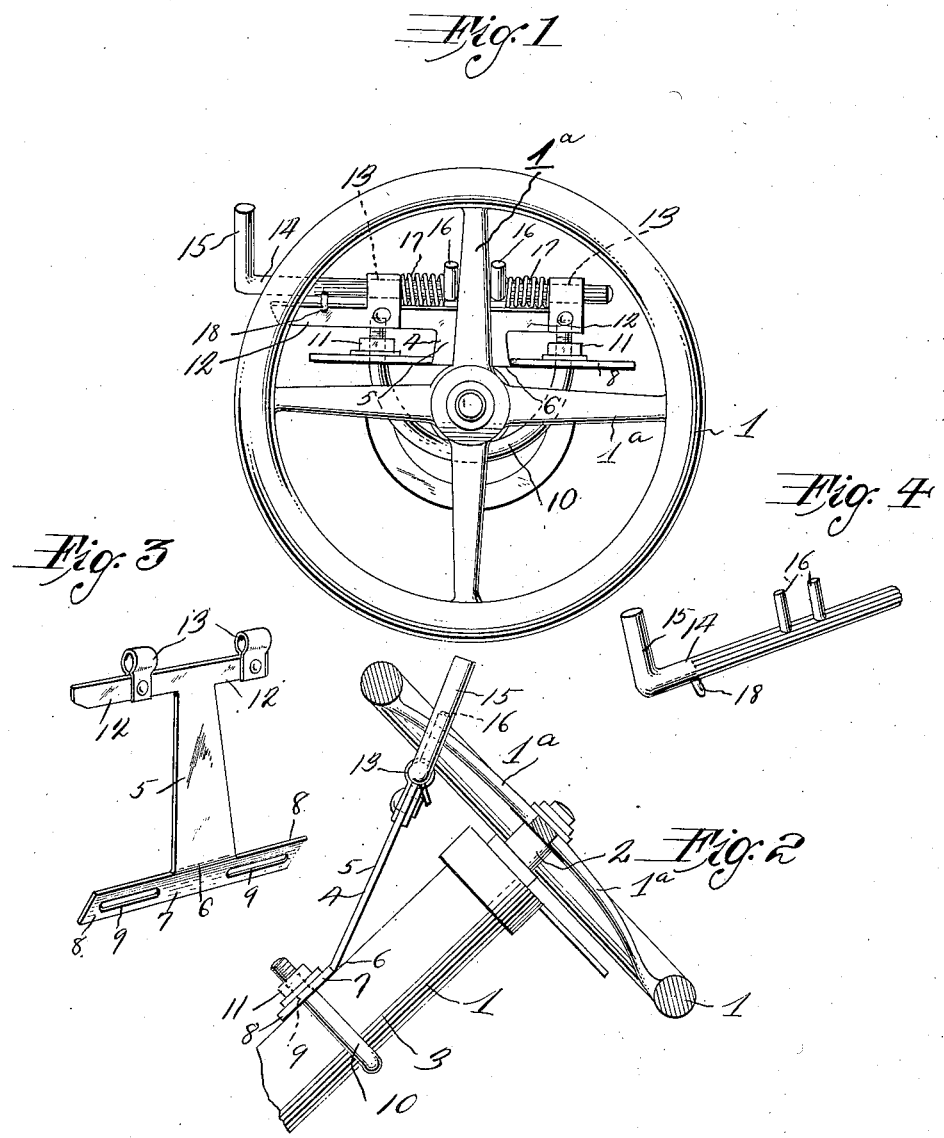
Inventor
George Hazelman
By D. Swift
Attorney

UNITED STATES PATENT OFFICE.

GEORGE HAZELMAN, OF WEST BROOKLYN, ILLINOIS.

PLOW-GUIDE-WHEEL HOLDER.

1,351,382.   Specification of Letters Patent.   Patented Aug. 31, 1920.

Application filed October 31, 1919. Serial No. 334,678.

*To all whom it may concern:*

Be it known that I, GEORGE HAZELMAN, a citizen of the United States, residing at West Brooklyn, in the county of Lee, State of Illinois, have invented a new and useful Plow-Guide-Wheel Holder; and I do hereby declare the following to be a full, clear, and exact description of the invention, such as will enable others skilled in the art to which it appertains to make and use the same.

The invention relates to tractor guide wheel holders and particularly to holders for guide wheels of plows of the tractor type and has for its principal object to provide means comprising a rockable bolt suspended and rockable in a horizontal position in a bearing carried by the steering column said bolts being provided with lugs adapted to engage on each side of one of the spokes of the guide wheel spider.

A further object is to provide spring means whereby a slight longitudinal movement will be allowed to the horizontally disposed bolt thereby taking up the strain on the guide wheel spider and also allowing a slight give to the wheels as they move through the furrow.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a plan view of a conventional form of guide wheel for tractor engines, showing the wheel holding device applied thereto.

Fig. 2 is a side view of the guide wheel showing part thereof broken away to show the device in engagement with the spoke of the wheel.

Fig. 3 is a perspective view of the supporting bracket.

Fig. 4 is a perspective view of the rockable and slidable bolt.

Referring to the drawings, the numeral 1 designates a conventional form of guide wheel, used on tractors. It is to be understood that the particular type of steering wheel and post may vary according to the type or make of tractor. The guide wheel 1 is secured on the upper end of the shaft 2 which shaft is rotatably mounted in a casing 3. The shaft 2 leads to any conventional form of mechanism for guiding and controlling the plows. During a plowing operation it is necessary for the plows to be held in position by means of the guide wheel 1, however there are long stretches of plowing in which it is not necessary to move the guide wheel 1, under these conditions the constant holding of the wheel by the operator of the tractor precludes him from having complete control and giving complete attention to the other mechanism of the tractor, to overcome this the guide wheel holder 4 is provided. The guide wheel 4 comprises a bracket 5 formed from a single piece of metal and is bent at 6 so as to form a transversely shaped angularly arranged plate 7, said plate having outwardly extending arms 8 in which elongated slots 9 are disposed. Plate 7 is adapted to fit against the face of the casing 1 as shown in Fig. 2 and a U-shaped bolt 10 surrounds the casing 1 and has its arms passing through the elongated apertures 9, there being nuts 11 threaded on the ends of the arms of the U-shaped bolt so that said bracket 5 may be securely held in position. The upwardly extending portion of the bracket 5 is provided with outwardly extending arms 12, said arms having thereon transversely disposed bearings 13, in which bearings a transversely disposed bolt 14 is rockably mounted. The bolt 14 is preferably frictionally held within the bearings 13 so that when said bolt is rocked by means of the operator grasping the handle 15 it will remain in the position to which it has been moved. Substantially centrally of the bolt 14 are upstanding lugs 16 which are adapted to engage on each side of one of the spokes 1ª of the spider of the guide wheel. During a plowing operation it has been found to be advisable to allow a slight resiliency or vibrating movement to the wheels and also to take up the sudden shock. To accomplish this coil springs 17 are provided which coil springs surround the bolt 14 and are disposed between the lugs 16 and the inner faces of the bearings 13. Thus it will be seen that as the plows move through the ground the arm 1ª of the spider being in engagement with the lugs 16, one or the other of the coil springs 17 will be slightly compressed according to the vibrating movement of the wheels.

When the wheel locking device is out of use the bolt 14 is rocked so that the lugs 16 will extend downwardly. However when it is desired to move the wheel to another position it will only be necessary to rock the bolt so that the lugs 16 will be below the spokes of the spider, then revolve the wheels until the plows are in their proper position after which the lugs are again moved upwardly and into engagement with one of the arms of the spider thereby holding the wheel in its new position.

To prevent the complete rotation of the bolt 14 a lug 18 is provided thereon, said lug being so positioned as to engage one of the arms 12 and limit the movement of said bolt.

The invention having been set forth what is claimed as new and useful is:—

1. A holder for tractor guide wheels of tractors, said holder comprising a bracket which may be supported in any suitable manner adjacent one side of the wheel, said bracket having rotatably mounted in bearings thereof a transversely disposed bolt, lugs spaced from each other and carried by said bolt and means whereby said lugs may be maintained in engagement with each side of a spoke of the guide wheel or out of engagement therewith.

2. A holder for tractor guide wheels of tractors, said holder comprising a bracket secured to the casing of the wheel shaft, said bracket extending upwardly and having bearings transversely disposed at its ends, a rockable shaft frictionally held in said bearings, lugs carried by said rockable shaft and being adapted to be moved upwardly so as to engage on each side of a spoke of the guide wheel, and spring means whereby the guide wheel will be allowed to vibrate during a plowing operation.

3. A holder for tractor guide wheels of tractors, said holder comprising a bracket secured to the casing of the wheel shaft, said bracket extending upwardly and outwardly, transversely disposed spaced bearings carried by the upper end of the bracket, a frictionally held rockable shaft mounted in said bearings, said shaft having substantially centrally disposed spaced lugs adapted to be moved upwardly to engage and hold a spoke of the wheel or downwardly to release the spoke, means for limiting the rockable movement of the shaft, coil springs surrounding the shaft and disposed between the lugs and their adjacent bracket bearings, said springs forming means for allowing the vibration of the wheel during a plowing operation and means adapted to be grasped by the hand for rocking the shaft as desired.

In testimony whereof I have signed my name to this specification in the presence of two subscribing witnesses.

GEORGE HAZELMAN.

Witnesses:
W. C. SMITH,
HARRY GASCOIGNE.